US012748498B2

(12) United States Patent
Li

(10) Patent No.: US 12,748,498 B2
(45) Date of Patent: Sep. 29, 2026

(54) INTERACTION METHOD AND APPARATUS, DEVICE, AND COMPUTER-READABLE STORAGE MEDIUM UTILIZING TARGET CONTROL REGION

(71) Applicant: Beijing Zitiao Network Technology Co., Ltd., Beijing (CN)

(72) Inventor: Xiaolin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/840,849

(22) PCT Filed: Mar. 7, 2023

(86) PCT No.: PCT/CN2023/080020
§ 371 (c)(1),
(2) Date: Aug. 22, 2024

(87) PCT Pub. No.: WO2023/174097
PCT Pub. Date: Sep. 21, 2023

(65) Prior Publication Data
US 2025/0181171 A1 Jun. 5, 2025

(30) Foreign Application Priority Data
Mar. 15, 2022 (CN) ........................ 202210253972.6

(51) Int. Cl.
*G06F 3/01* (2006.01)

(52) U.S. Cl.
CPC .................................. *G06F 3/017* (2013.01)

(58) Field of Classification Search
CPC .......... A63F 13/525; G06F 3/01; G06F 3/017; G06F 3/0484; G06T 19/00; G06V 40/20; G02B 27/017; G02B 27/0093
See application file for complete search history.

(56) References Cited

U.S. PATENT DOCUMENTS

2014/0225812 A1* 8/2014 Hosoya .............. G02B 27/0093 345/8
2015/0227222 A1* 8/2015 Sako .................... G02B 27/017 345/173
(Continued)

FOREIGN PATENT DOCUMENTS

CN 107885316 A 4/2018
CN 108543308 A 9/2018
(Continued)

OTHER PUBLICATIONS

International Search Report received for PCT Patent Application No. PCT/CN2023/080020, mailed on May 31, 2023, 3 pages.
(Continued)

*Primary Examiner* — Richard J Hong

(57) ABSTRACT

Embodiments of the present disclosure provide an interaction method and apparatus utilizing a target control region, a device, and a computer-readable storage medium. The method obtains a target control instruction corresponding to a target object, and determines a target control region corresponding to the target control instruction in a virtual scene with the target control instruction. Then the method determines a target element according to the target control instruction and the target control region, thus responds to the target control instruction based on the target element.

15 Claims, 4 Drawing Sheets

(56) References Cited

U.S. PATENT DOCUMENTS

| | | | | |
|---|---|---|---|---|
| 2015/0317518 | A1* | 11/2015 | Fujimaki .............. | G02B 27/017<br>345/633 |
| 2017/0287222 | A1* | 10/2017 | Fujimaki ................. | G06F 3/017 |
| 2019/0285896 | A1 | 9/2019 | Kobayashi et al. | |

FOREIGN PATENT DOCUMENTS

| | | | |
|---|---|---|---|
| CN | 108983967 | A | 12/2018 |
| CN | 111249719 | A | 6/2020 |
| CN | 111450527 | A | 7/2020 |
| CN | 111813214 | A | 10/2020 |
| CN | 112148189 | A | 12/2020 |
| CN | 112486031 | A | 3/2021 |
| CN | 113190110 | A | 7/2021 |
| CN | 113457151 | A | 10/2021 |

OTHER PUBLICATIONS

First report received from Chinese patent application No. 202210253972.6 mailed on Mar. 28, 2026, 3 pages.

Tobi, Unity 2019.3 XR Interaction Toolkit Tutorial Series (Part 2), Feb. 2, 2020, 6 pages (3 pages English Translation and 3 pages Original Copy).

* cited by examiner

INTERACTION METHOD AND APPARATUS, DEVICE, AND COMPUTER-READABLE STORAGE MEDIUM UTILIZING TARGET CONTROL REGION

CROSS-REFERENCE TO RELATED APPLICATION(S)

This is a national stage application filed under 35 U.S.C. 371 based on International Patent Application No. PCT/CN2023/080020, filed Mar. 7, 2023, which disclosure claims the right of priority to Chinese patent application No. 202210253972.6, filed on Mar. 15, 2022 and entitled "Interaction Method and Apparatus, Device, and Computer-Readable Storage Medium", the disclosures of which are incorporated herein by reference in their entities.

FIELD

The disclosure relates to the technical field of virtual reality, and particularly relates to a method, apparatus, device, and computer-readable storage medium for interaction.

BACKGROUND

In a related technology, during the realization of interaction between a user and an interface in a virtual reality scene, a point of alignment of a ray associated with a pointing direction of a gamepad with the interface in the virtual scene is generally determined based on the orientation of the joystick, and a corresponding response is made directly to a further operation on the gamepad by the user. In this way, it is prone to false responses in determining an operation on the interface by the user, with poor anti-interference capability.

SUMMARY

The examples of the disclosure provide an implementation solution different from the related art, so as to solve the technical problem of poor anti-interference capability in the related art in a way of interaction between a user and an interface in a virtual reality scene.

In a first aspect, the disclosure provides a method for interaction. The method includes:

- obtaining a target control instruction corresponding to a target object;
- determining a target control region corresponding to the target control instruction in a virtual scene with the target control instruction, and the target control region displays at least one element;
- determining a target element according to the target control instruction and the target control region, and the target element is comprised in the at least one element; and
- responding to the target control instruction based on the target element.

In a second aspect, the disclosure provides an apparatus for interaction. The apparatus includes:

- an obtaining module configured to obtain a target control instruction corresponding to a target object;
- a first determination module configured to determine a target control region corresponding to the target control instruction in a virtual scene with the target control instruction, and the target control region displays at least one element;

- a second determination module configured to determine a target element according to the target control instruction and the target control region, where the target element is comprised in the at least one element; and
- a response module configured to respond to the target control instruction based on the target element.

In a third aspect, the disclosure provides an electronic device. The electronic device includes:

- a processor; and
- a memory configured to store an executable instruction of the processor; where
- the processor is configured to execute any one of the methods in the first aspect or the possible embodiments of the first aspect by executing the executable instruction.

In a fourth aspect, an example embodiment of the disclosure provides a computer-readable storage medium. The computer-readable storage medium stores a computer program. The computer program implements any one of the methods in the first aspect or the possible embodiments of the first aspect when executed by a processor.

In a fifth aspect, an example of the disclosure provides a computer program product. The computer program product includes a computer program. The computer program implements any one of the methods in the first aspect or the possible embodiments of the first aspect when executed by a processor.

The disclosure provides a solution including: obtaining a target control instruction corresponding to a target object; determining a target control region corresponding to the target control instruction in a virtual scene with the target control instruction, and the target control region displays at least one element; determining a target element according to the target control instruction and the target control region, where the target element is comprised in the at least one element; and responding to the target control instruction based on the target element. With the solution, the target element can be determined in combination with recognition of the region where the element is located, the anti-interference capability is also strong, and the user experience is improved.

BRIEF DESCRIPTION OF THE DRAWINGS

In order to more clearly illustrate technical solutions in the examples of the disclosure or in the related art, a brief introduction to the accompanying drawings required for the description of the examples or the related art will be provided below. Apparently, the accompanying drawings in the following description are some of the examples of the disclosure, and those ordinary skills in the art would also be able to derive other drawings from these drawings without making creative efforts. In the drawings.

DETAILED DESCRIPTION OF EMBODIMENTS

Figure 1:
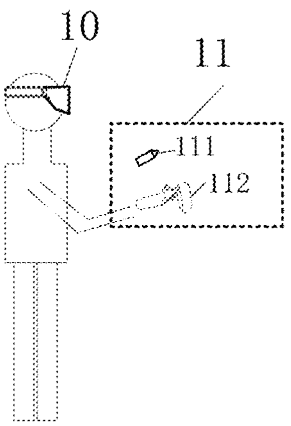
FIG. 1 is a schematic structural diagram of a system for interactive according to an example of the disclosure.

Examples of the disclosure are described in detail below, and instances of the examples are illustrated in the drawings. The examples described below by reference to the drawings are illustrative for explaining the disclosure and are not to be construed as limiting the disclosure.

The terms "first", "second" and so forth, in the description and claims of the examples of the disclosure and in the accompanying drawings, are used to distinguish between similar objects and not necessarily to describe a particular order or sequential order. It should be understood that the data used in this way may be interchanged where appropriate, such that the examples of the disclosure described herein can be, for example, implemented in other sequences than those illustrated or described herein. Furthermore, the terms "comprise", "include", "have", and any variations thereof are intended to cover non-exclusive inclusions, for example, processes, methods, systems, products, or devices that includes a series of steps or units are not necessarily limited to those explicitly listed steps or units, but may include other steps or units not explicitly listed or inherent to these processes, methods, products, or devices.

First, some terms in the examples of the disclosure are explained below to facilitate understanding by those skilled in the art.

VR: virtual reality. The virtual reality technology is a brand-new practical technology, and includes computer, electronic information, and simulation technologies. Its basic implementation mode is that a computer simulates a virtual environment to provide people with a sense of environmental immersion.

The technical solutions of the disclosure and how the technical solutions of the disclosure solve the above technical problem are described in detail below with specific examples. The following specific examples may be combined with each other, and the same or similar concepts or processes may not be repeated in some examples. The examples of the disclosure will be described in detail below with reference to the accompanying drawings.

FIG. 1 is a schematic structural diagram of a system for interactive according to an example of the disclosure. The system includes a control device 11 and a display device 10. The control device 11 is connected to the display device 10, specifically, through Bluetooth, or through a network.

Specifically, the control device 11 is configured for a user to trigger a target control instruction and transmit the target control instruction to the display device 10.

The display device 10 is configured to obtain a target control instruction corresponding to a target object; determine a target control region corresponding to the target control instruction in a virtual scene with the target control instruction, and the target control region displays at least one element; determine a target element according to the target control instruction and the target control region, and the target element is comprised in the at least one element; and respond to the target control instruction based on the target element.

In some alternative examples of the disclosure, the control device 11 may be a gamepad 112 or a pen-shaped holding device 111.

In some examples, a user may also directly recognize a gesture of a hand of the user through the display device, so as to give a target control instruction through the gesture action of the hand of the user, and to control the display device.

Alternatively, the display device 10 may be a head-mounted device.

Alternatively, the display device 10 may include a data processing device and a head-mounted device. The data processing device is configured to obtain a target control instruction corresponding to a target object; determine a target control region corresponding to the target control instruction in a virtual scene with the target control instruction, and the target control region displays at least one element; determine a target element according to the target control instruction and the target control region, and the target element is comprised in the at least one element; and respond to the target control instruction with the head-mounted device based on the target element. The head-mounted device is configured to display a corresponding picture. The data processing device may be a user terminal device, a personal computer (PC), or other devices having a data processing function.

Reference may be made to the description of each method example below for specific working principles and specific interaction processes of the component units in this system example, such as the control device 11 and the display device 10.

Figure 2A:
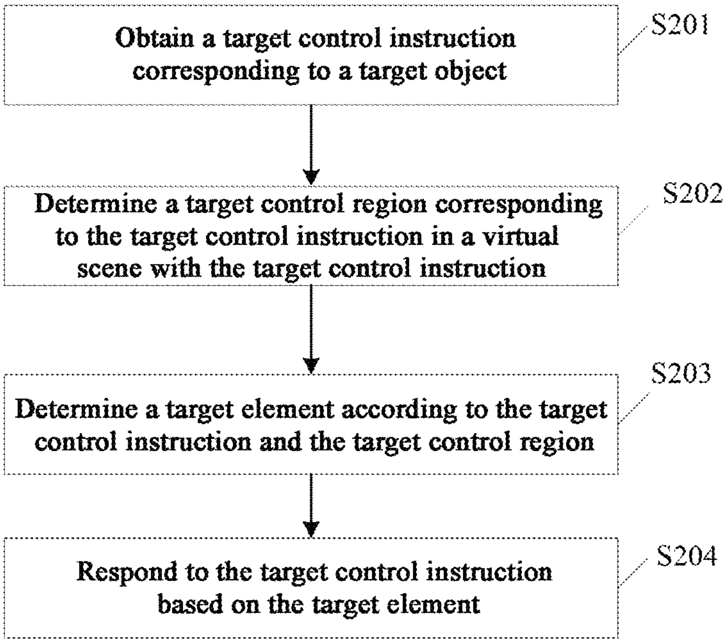
FIG. 2*a* is a schematic flowchart of a method for interaction provided in an example of the disclosure.

FIG. 2*a* is a schematic flowchart of a method for interaction provided in an illustrative example of the disclosure. The method may be applied to an extended reality (XR) device, alternatively, the display device in the example corresponding to FIG. 1. The method at least includes:

S201, obtain a target control instruction corresponding to a target object;

S202, determine a target control region corresponding to the target control instruction in a virtual scene with the target control instruction, and the target control region displays at least one element;

S203, determine a target element according to the target control instruction and the target control region, and the target element is comprised in the at least one element; and S204, respond to the target control instruction based on the target element.

Alternatively, the target object may be the control device in the example corresponding to FIG. 1, that is, the gamepad or the pen-shaped holding device.

Alternatively, the target object may also be a hand of the user.

When the target object is the control device, the target control instruction may be a control instruction received from the control device. When the target object is the hand of the user, for a determination mode of the target control instruction, the method further includes:

S01, obtain image information corresponding to the target object within a first preset duration;

S02, determine action information of a user according to the image information; and S03, trigger a step of obtaining a target control instruction corresponding to a target object when the action information is comprised in a preset gesture information set. The target control instruction is a control instruction corresponding to the action information.

Specifically, the image information may be captured by a camera set arranged on the display device, and alternatively, may be captured by a capturing apparatus arranged outside the display device and transmitted to the display device.

Alternatively, in S02, the step of determining action information of a user according to the image information includes:

input the image information into a preset action recognition model, execute the action recognition model, and obtain the action information of the user. The action recognition model is a machine learning model obtained by training a plurality of sets of sample data.

Alternatively, the action information includes one or more of movement track information of the hand, and motion information of at least one finger joint of the hand. The movement track information of the hand includes movement track information of a palm center. The motion information of the finger joint may be motion information of the finger joint relative to the palm center. The motion information of the finger joint may be movement information of a three-dimensional position of a joint point corresponding to the finger joint.

Alternatively, with respect to the gesture information set in S03, the gesture information set includes a plurality of groups of hand action information, and gesture types corresponding to the groups of hand action information. The method further includes:

matching the action information of the user with at least part of the hand action information in the gesture information set, and obtaining a matching result between the action information of the user and the at least part of the hand action information, and the matching result includes a similarity value between the action information of the user and each group of hand action information in the at least part of the hand action information;

obtaining a target result corresponding to a highest similarity value in the matching result; and determining that the action information of the user is comprised in the preset gesture information set if the similarity value corresponding to the target result, that is, the highest similarity value in the matching result, is greater than a preset threshold.

A gesture type corresponding to the target result is a target gesture type corresponding to the action information of the user.

The control instruction corresponding to the target gesture type is a control instruction corresponding to the action information (that is, action information of the user).

In some alternative examples of the disclosure, the pose information may include position information and pose angle information. The position information is three-dimensional coordinate information. The pose angle information is rotation information of corresponding coordinate axes about the three-dimensional coordinate information. For example, the pose angle information includes angle information rotating around an X axis, angle information rotating around a Y axis, and angle information rotating around a Z axis.

Alternatively, in S202, the step of determining a target control region corresponding to the target control instruction in a virtual scene with the target control instruction may include:

S221, obtain pose information corresponding to the target object when the target control instruction is obtained;

S222, determine a region corresponding to the pose information in the virtual scene with the pose information; and S223, determine the target control region according to the region corresponding to the pose information. The step of determining the target control region according to the region corresponding to the pose information may specifically include: take the region corresponding to the pose information as the target control region.

Alternatively, in S221, the step of obtaining pose information corresponding to the target object includes:

determining the pose information received from the target object as the pose information corresponding to the target object, or, obtaining image information corresponding to the target object; and determine the pose information corresponding to the target object according to the image information.

Alternatively, when the target object is a control device, the pose information received from the target object is determined as the pose information corresponding to the target object. The pose information may be included in the target control instruction or not.

Alternatively, the pose information received from the target object is self pose information determined by the target object according to its own measurement module.

Alternatively, when the target object is the hand of the user, the image information corresponding to the target object is obtained; and the pose information corresponding to the target object is determined according to the image information.

It should be noted that the target object in the disclosure may also be other parts of the user, such as arms, eyes, a face, etc.

Alternatively, the pose information corresponding to the hand may include three-dimensional position information of the palm center and pointing information of the hand. The pointing information of the hand is direction information of a line connecting a wrist joint of the hand and a root joint of the middle finger towards the root joint of the middle finger. The direction information may include pose angle information of three coordinate axes corresponding to the three-dimensional position information of the palm center.

Alternatively, in S222, the step of determining a region corresponding to the pose information in the virtual scene with the pose information includes:

S2021, determine a target pose interval to which the pose information belongs according to the pose information and preset pose interval information, and the pose interval information includes a plurality of pose intervals;

S2022, determine a target region corresponding to the target pose interval with the target pose interval and preset first corresponding relation information; and S2023, determine the region corresponding to the pose information based on the target region.

Specifically, the first corresponding relation information includes a plurality of pose intervals, and a region corresponding to each pose interval in the plurality of pose intervals.

Alternatively, in S2023, the step of determining the region corresponding to the pose information according to the target region includes: taking the target region as a region corresponding to the pose information.

Figure 2B:
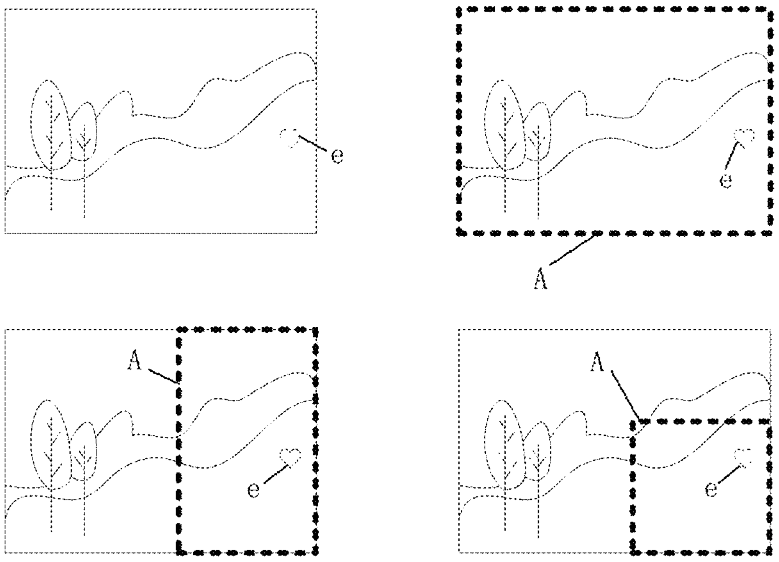
FIG. 2*b* is a schematic diagram of a target control region according to an example of the disclosure.

Specifically, the pose information and a size of the corresponding region may be related to sensitivity of the control device. Accordingly, the target control instruction and a size of the corresponding target control region may also be related to the sensitivity of the control device. Specifically, as shown in FIG. 2*b*, the target control region corresponding to the target control instruction corresponding to the pose information abc may be A in FIG. 2*b*. FIG. 2*b* shows sizes of three target control regions. The larger the target control region is, the stronger the anti-interference capability is, and e in FIG. 2*b* is the target element.

Alternatively, the method further includes:

obtain a sensitivity level selected by a user according to an associated sensitivity selection control; and determine a size parameter of a region corresponding to each pose interval in the first corresponding relation information according to the sensitivity level, where the higher the sensitivity level is, the larger the region corresponding to the same pose interval is.

Alternatively, in S203, the step of determining a target element according to the target control instruction and the target control region includes:

S2031, obtain a set of control instructions corresponding to the target control region, and the set of control instructions comprises a plurality of first control instructions and elements corresponding to the first control instructions; and S2032, determine the target element corresponding to the target control instruction based on the target control instruction and the set of control instructions.

Alternatively, when the target object is the control device, the corresponding target control instruction may be an instruction of clicking a key, an instruction of double-clicking a key, an instruction of pressing a key for a long time, etc.

Alternatively, when the target object is the hand, the corresponding target control instruction may be first clenching, index finger pressing, etc.

Alternatively, in S2032, the step of determining the target element corresponding to the target control instruction according to the target control instruction and the set of control instructions comprises: taking an element corresponding to a first control instruction identical to the target control instruction in the set of control instructions as the target element.

In some alternative examples of the disclosure, when the target object is the control device and the target control instruction is an instruction of clicking a preset key, the target element may be a heart identifier "♡".

Furthermore, in S204, the step of responding to the target control instruction according to the target element includes:

S2041, obtain second corresponding relation information corresponding to the target element, and the second corresponding relation information includes a plurality of second control instructions for the target element, and task information corresponding to each of the plurality of second control instructions;

S2042, determine target task information corresponding to the target control instruction based on the target control instruction and the second corresponding relation information; and S2043, respond to the target control instruction according to the target task information.

Alternatively, the target task information may be control information for the target element, such as like, or task information for controlling over a screen content of the target control region implemented by an operation on the target element, such as deletion, enlargement, pause, etc.

Alternatively, in S2043, the step of responding to the target control instruction according to the target task information includes: control execution of the target task information.

In some alternative examples of the disclosure, when the target object is the control device and the target control instruction is an instruction of clicking a preset key, the target element is a heart identifier "♡". When the target task information is like, the step of responding to the target control instruction according to the target task information includes: control the heart identifier "♡" to change color.

Alternatively, the method further includes:

S21, obtain update information for the second corresponding relation information input by a related person; and S22, update the second corresponding relation information according to the update information.

Specifically, the update information may include any one or more of addition, deletion, and modification, a second control instruction for the second corresponding relation information, or update information of task information corresponding to the second control instruction.

Alternatively, to further enhance the user experience, the method further includes:

S1, obtain a target ray element corresponding to the pose information; and

S2, display the target ray element based on the pose information.

Specifically, the step of displaying the target ray element based on the pose information includes: determine feature information of the target ray element based on the pose information; and display the target ray element according to the feature information. The feature information includes at least one or more of the following: start position information, center position information, color information, orientation information, length information, and thickness parameter information. The center position information is three-dimensional coordinate information of a center of the target ray element. The orientation information is pose angle information of the target ray element. The pose angle information is rotation information of coordinate axes corresponding to three-dimensional coordinate information and surrounding the center of the target ray element.

Alternatively, the method further includes:

obtain a receiving timing corresponding to the target control instruction; and display a corresponding effect according to the receiving timing and the target ray element.

Alternatively, the step of displaying a corresponding effect according to the receiving timing and the target ray element includes:

obtain a effect element corresponding to the target element; and control the effect element to move at a preset rate along the orientation of the target ray element at the receiving timing.

Alternatively, the step of displaying a corresponding effect according to the receiving timing and the target ray element includes:

obtain an effect element corresponding to the target element; and control the effect element to move at a preset rate along the target ray element during a preset time period after the receiving timing.

Figure 2C:
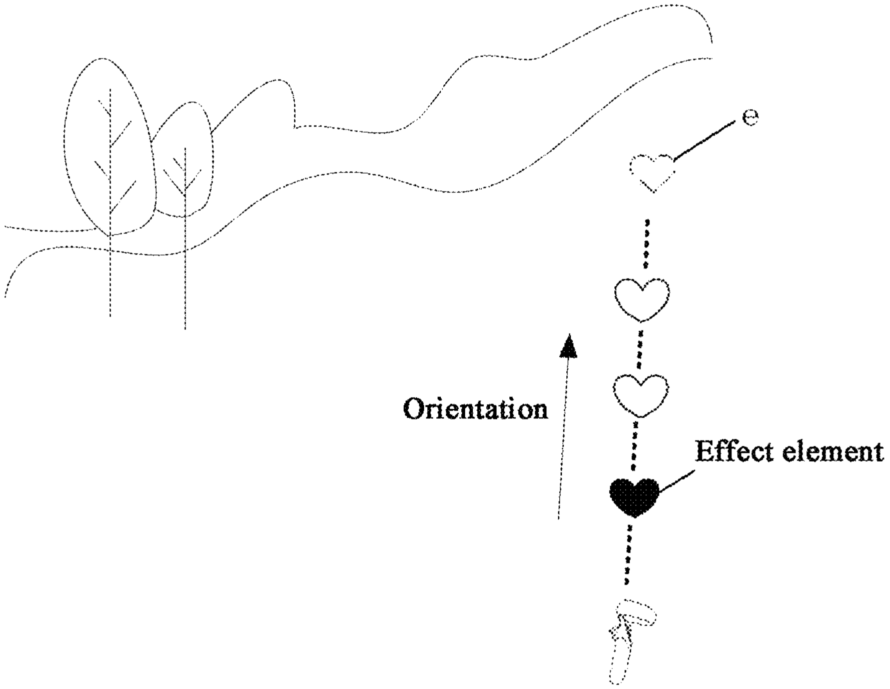
FIG. 2*c* is a scene schematic diagram of a display mode of a target ray element according to an example of the disclosure.

Alternatively, a model corresponding to the target object may also be displayed. In some alternative examples of the disclosure, a display mode of the target ray element may be as shown in FIG. 2*c*.

Alternatively, the method further includes: display a corresponding special collision effect in a case that it is detected that a distance between position information of the effect element and position information of the target element is less than a first preset distance.

Alternatively, the method further includes: display a corresponding special collision effect if it is detected that a distance between position information of the effect element and position information of a center of the target control region is less than a second preset distance.

Alternatively, an identifier of the effect element may be set by the user, such as a heart identifier, a cartoon identifier, etc.

The position information of the effect element and the position information of the target element may respectively refer to position information of the effect element in the virtual scene and position information of the target element in the virtual scene. Correspondingly, the position information of the center of the target control region is also the position information of the center of the target control area in the virtual scene.

The special collision effect includes any one or more of the following:

change color of the target element;

enlarge the target element according to a preset proportion;

change characters corresponding to the target control region into preset characters;

change color of the display content of the target control region; and default collision animation.

Figure 2D:
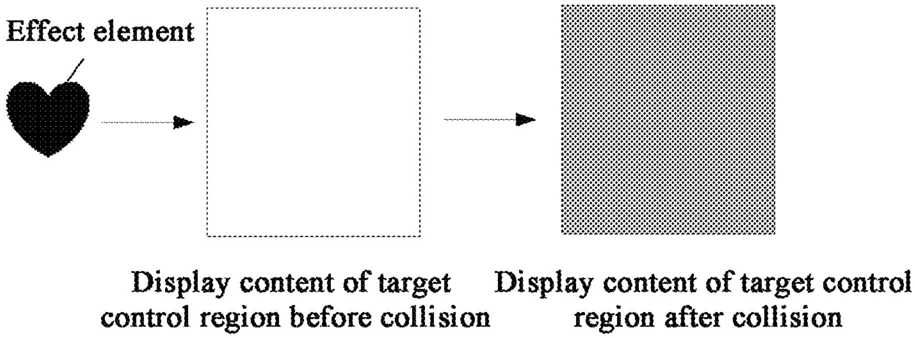
FIG. 2*d* is a schematic diagram of a display mode of a special collision effect provided in an example of the disclosure.

In some alternative examples of the disclosure, a display mode of the special collision effect may be as shown in FIG. 2*d*.

Alternatively, the special collision effect may be a special stereoscopic effect. This solution may achieve multi-directional display of the special collision effect in a virtual reality space, thereby making the scene more realistic, further improving immersion of the user, and improving the user experience.

Alternatively, after the effect element is controlled to move at a preset rate along the target ray element for a second preset duration, in a case that it is not detected that the distance between the position information of the effect element and the position information of the target element is less than the first preset distance, no response is made, and the target ray element may stop being displayed.

Alternatively, after the effect element is controlled to move at a preset rate along the target ray element for a second preset duration, in a case that it is not detected that the distance between the position information of the effect element and the position information of the center of the target control region is less than the second preset distance, no response is made, and the target ray element may stop being displayed.

Specifically, the regions in the virtual scene involved in the disclosure are display regions in the virtual scene. Each display region corresponds to a coordinate range relative to the virtual scene.

Alternatively, the display region in the virtual scene in the disclosure may include a screen region and an operating region. The operating region may be at least a part of the screen region, cover the screen region, partially overlap the screen region, or be independent of the screen region.

Alternatively, an angle between a display surface corresponding to the operating region and a display surface corresponding to the screen region may be a preset value.

Alternatively, one operating region may be provided. The target control region determined according to the solution of the disclosure may be the operating region or correspond to the operating region.

Alternatively, a plurality of operating regions may be provided. Display surfaces corresponding to the plurality of operating regions may be a same surface. The target control region determined according to the solution of the disclosure may be one of the plurality of operating regions or correspond to one of the operating regions.

Figure 2E:
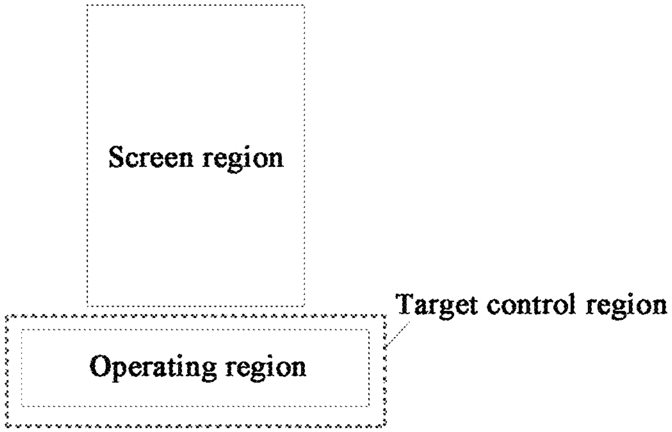
FIG. 2*e* is a schematic diagram illustrating a relation between an operating region and a target control region according to an example of the disclosure.

Alternatively, a relation between the target control region and the corresponding operating region satisfies the following preset conditions: a center of the target control region coincides with a center of the operating region, an area of the target control region is a preset multiple of an area of the operating region, and the operating region is located within the target control region, as shown in FIG. 2*e*.

Alternatively, the target control region may also be determined by detecting a target ray element displayed in the virtual scene, for example, by obtaining an intersection of a target photographing element and a display surface in the virtual scene; and determining the target control region according to position information of the intersection.

The solution is further described below in combination with an application scene of the disclosure:

Scene 1

After a user wears a headset and enters a virtual reality (VR) scene, the user can open a corresponding application program. A display region of the application program may include a screen region and an operating region. The operating region may be located at a side of the screen region. The user can control the operating region by operating a gamepad to interact with and a virtual reality scene.

Scene 2

After a user wears a headset and enters a VR scene, a screen region and an operating region are displayed in a virtual scene, and a ray determined according to an operation by the user on a gamepad is displayed. When the user moves the gamepad, the ray moves correspondingly. When the ray intersects with a target control region corresponding to an operating region in the virtual scene and the user triggers a control instruction through the gamepad, the headset responds to the control instruction and executes a task, such as like, forward, etc., corresponding to the control instruction.

The disclosure provides a solution including: obtain a target control instruction corresponding to a target object; determine a target control region corresponding to the target control instruction in a virtual scene with the target control instruction, and the target control region displays at least one element; determine a target element according to the target control instruction and the target control region, and the target element is comprised in the at least one element; and respond to the target control instruction based on the target element. With the solution, the target element can be determined in combination with recognition of the region where the element is located, the anti-interference capability is also strong, and the user experience is improved.

Figure 3:
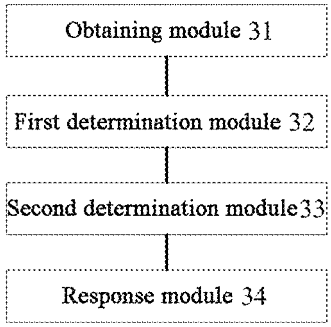
FIG. 3 is a schematic structural diagram of an apparatus for interaction according to an example of the disclosure.

FIG. 3 is a schematic structural diagram of an apparatus for interaction according to an illustrative example of the disclosure. The apparatus for interaction may be applied to an extended reality (XR) device and includes:

an obtaining module 31 configured to obtain a target control instruction corresponding to a target object;

a first determination module 32 configured to determine a target control region corresponding to the target control instruction in a virtual scene with the target control instruction, and the target control region displays at least one element;

a second determination module 33 configured to determine a target element according to the target control instruction and the target control region, and the target element is comprised in the at least one element; and a response module 34 configured to respond to the target control instruction based on the target element.

According to one or more examples of the disclosure, when the apparatus is configured to determine the target control region corresponding to the target control instruction in a virtual scene with the target control instruction, the apparatus is specifically configured to:

obtain pose information corresponding to the target object when the target control instruction is obtained;

determine a region corresponding to the pose information in the virtual scene with the pose information; and determine the target control region according to the region corresponding to the pose information.

According to one or more examples of the disclosure, the apparatus is further configured to:

obtain image information corresponding to the target object within a first preset duration;

determine action information of a user according to the image information; and trigger a step of obtaining a target control instruction corresponding to a target object when the action information is comprised in a preset gesture information set.

According to one or more examples of the disclosure, when the apparatus is configured to obtain the pose information corresponding to the target object, the apparatus is specifically configured to:

determine the pose information received from the target object as the pose information corresponding to the target object, or, obtain image information corresponding to the target object; and determine the pose information corresponding to the target object according to the image information.

According to one or more examples of the disclosure, when the apparatus is configured to determine the region corresponding to the pose information in the virtual scene with the pose information, the apparatus is specifically configured to:

determine a target pose interval to which the pose information belongs according to the pose information and preset pose interval information, where the pose interval information comprises a plurality of pose intervals;

determine a target region corresponding to the target pose interval with the target pose interval and preset first corresponding relation information; and determine the region corresponding to the pose information according to the target region.

According to one or more examples of the disclosure, when the apparatus is configured to determine the target element according to the target control instruction and the target control region, the apparatus is specifically configured to:

obtain a set of control instructions corresponding to the target control region, where the set of control instructions comprises a plurality of first control instructions and elements corresponding to the first control instructions; and determine the target element corresponding to the target control instruction according to the target control instruction and the set of control instructions.

According to one or more examples of the disclosure, when the apparatus is configured to respond to the target control instruction according to the target element, the apparatus is specifically configured to:

obtain second corresponding relation information corresponding to the target element, and the second corresponding relation information includes a plurality of second control instructions for the target element, and task information corresponding to each of the plurality of second control instructions;

determine target task information corresponding to the target control instruction according to the target control instruction and the second corresponding relation information; and respond to the target control instruction according to the target task information.

According to one or more examples of the disclosure, the apparatus is further configured to:

obtain a target ray element corresponding to the pose information; and display the target ray element based on the pose information.

According to one or more examples of the disclosure, the apparatus is further configured to:

obtain a receiving timing corresponding to the target control instruction; and display a corresponding effect based on the receiving timing and the target ray element.

It should be understood that the apparatus example and the method example may correspond to each other, and reference may be made to the method example for similar descriptions, which will not be repeated herein to avoid repetition. Specifically, the apparatus may execute the above method example, and the foregoing and other operations and/or functions of each module in the apparatus are respectively for the corresponding flow in each method in the above method example, and are not repeated here for brevity.

An apparatus of the example of the disclosure is described above in conjunction with the accompanying drawings from the perspective of functional modules. It should be understood that the functional modules may be implemented in a form of hardware, may be implemented in a form of a software instruction, or may also be implemented in a form of combination of hardware and software modules. Specifically, each step of the method example in the examples of the disclosure may be completed by an integrated logic circuit in hardware and/or instructions in a software form in a processor. The steps of the methods disclosed in conjunction with the example of the disclosure may be directly completed by a hardware coding processor, or completed by a combination of hardware and software modules in a coding processor. Alternatively, the software module may be located in a random access memory, a flash memory, a read-only memory, a programmable read-only memory, an electrically erasable programmable memory, a register, and other storage media well known in the art. The storage medium is located in the memory, and the processor reads information from the memory and completes the steps of the method example described above in conjunction with its hardware.

Figure 4:
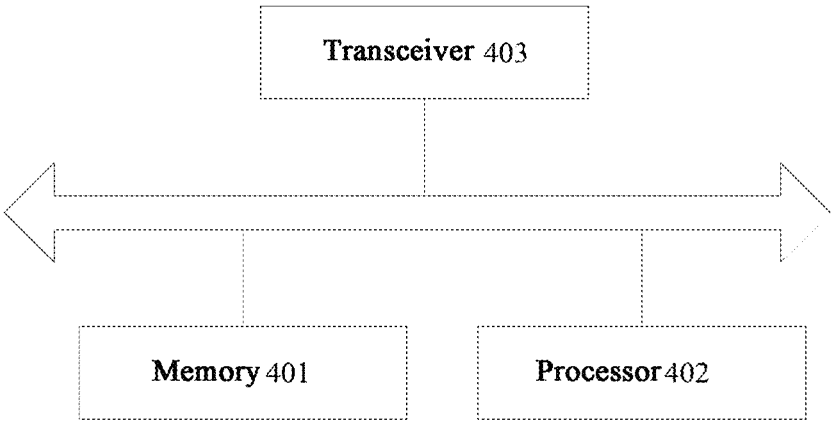
FIG. 4 is a schematic structural diagram of an electronic device according to an example of the disclosure.

FIG. 4 is a structural block diagram of an electronic device provided in an example of the disclosure. The electronic device may include:

a memory 401 and a processor 402. The memory 401 is configured to store a computer program and transmit a program code to the processor 402. In other words, the processor 402 may call and operate the computer program from the memory 401, so as to perform the method in the example of the disclosure.

For example, the processor 402 may be configured to execute the method example described above according to an instruction in the computer program.

In some examples of the disclosure, the processor 402 may include, but is not limited to:

a general-purpose processor, a digital signal processor (DSP), an application specific integrated circuit (ASIC), a field programmable gate array (FPGA), other programmable logic devices, a discrete gate, a transistor logic device, a discrete hardware component, etc.

In some examples of the disclosure, the memory 401 includes, but is not limited to:

a volatile memory and/or a nonvolatile memory. A read-only memory (ROM), a programmable ROM (PROM), an erasable PROM (EPROM), an electrically EPROM (EEPROM), or a flash memory may be used as a nonvolatile memory. A random access memory (RAM) may be used as a volatile memory, which serves as an external cache. With illustrative but not restrictive description, various forms of RAMs are available, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SL-DRAM), and a direct rambus RAM (DRRAM).

In some examples of the disclosure, the computer program may be divided into one or more modules. The one or more modules are stored in the memory 401 and are executed by the processor 402, to complete the method provided in the disclosure. The one or more modules may be a series of instruction segments of computer program that may implement specific functions, where the instruction segments are configured to describe an execution process of the computer program in the electronic device.

As shown in FIG. 4, the electronic device may further include:

a transceiver 403, where the transceiver 403 may be connected to the processor 402 or the memory 401.

The processor 402 may control the transceiver 403 to communicate with other devices, specifically, to transmit information or data to other devices, or to receive information or data sent from other devices. The transceiver 403 may include a transmitter and a receiver. The transceiver 403 may further include antennas, and one or more antennas may be provided.

It should be understood that various components in the electronic device are connected together with a bus system. The bus system includes a data bus, and further includes a power bus, a control bus, and a status signal bus.

The disclosure further provides a computer storage medium, storing a computer program. The computer program causes the computer to execute the method of the above method example when executed by a computer. Alternatively, an example of the disclosure further provides a computer program product containing an instruction. The instruction causes the computer to execute the method of the above method example when executed by a computer.

When implemented by software, the examples can be implemented in whole or in part as a computer program product. The computer program product includes one or more computer instructions. When loaded and executed on a computer, the computer program instruction generates in whole or in part the flows or functions described in accordance with the examples of the disclosure. The computer may be a general purpose computer, a special purpose computer, a computer network, or other programmable apparatuses. The computer instruction may be stored in a computer-readable storage medium or transmitted from one computer-readable storage medium to another computer-readable storage medium. For example, the computer instruction can be transmitted from one website, computer, server, or data center to another website, computer, server, or data center in a mode of a wire (for example, coaxial cable, optical fiber, digital subscriber line (DSL)) or radio (for example, infrared, radio, microwave, etc.). The computer-readable storage medium may be any available medium that can be accessed by a computer or a data storage device including one or more available media integrated as a server, data center, etc. The available medium may be a magnetic medium (for example, floppy disk, hard disk, magnetic tape), an optical medium (for example, digital video disk (DVD)), or a semiconductor medium (for example, solid state disk (SSD)), etc.

According to one or more examples of the disclosure, a method for interaction is provided. The method includes:

obtain a target control instruction corresponding to a target object;

determine a target control region corresponding to the target control instruction in a virtual scene with the target control instruction, where the target control region displays at least one element;

determine a target element according to the target control instruction and the target control region, and the target element is comprised in the at least one element; and respond to the target control instruction based on the target element.

According to one or more examples of the disclosure, the step of determining a target control region corresponding to the target control instruction in a virtual scene with the target control instruction includes:

obtain pose information corresponding to the target object when the target control instruction is obtained;

determine a region corresponding to the pose information in the virtual scene with the pose information; and determine the target control region according to the region corresponding to the pose information.

According to one or more examples of the disclosure, the method further includes:

obtain image information corresponding to the target object within a first preset duration;

determine action information of a user according to the image information; and trigger a step of obtaining a target control instruction corresponding to a target object when the action information is comprised in a preset gesture information set.

According to one or more examples of the disclosure, the step of obtaining pose information corresponding to the target object includes:

use the pose information received from the target object as the pose information corresponding to the target object, and alternatively, obtain image information corresponding to the target object; and determine the pose information corresponding to the target object according to the image information.

According to one or more examples of the disclosure, the step of determining a region corresponding to the pose information in the virtual scene with the pose information includes:

determine a target pose interval to which the pose information belongs according to the pose information and preset pose interval information, where the pose interval information comprises a plurality of pose intervals;

determine a target region corresponding to the target pose interval with the target pose interval and preset first corresponding relation information; and determine the region corresponding to the pose information according to the target region.

According to one or more examples of the disclosure, the step of determining a target element according to the target control instruction and the target control region includes:

obtain a set of control instructions corresponding to the target control region, where the set of control instructions comprises a plurality of first control instructions and elements corresponding to the first control instructions; and determine the target element corresponding to the target control instruction according to the target control instruction and the set of control instructions.

According to one or more examples of the disclosure, the step of responding to the target control instruction according to the target element includes:

obtain second corresponding relation information corresponding to the target element, where the second corresponding relation information includes a plurality of second control instructions for the target element, and task information corresponding to each of the plurality of second control instructions;

determine target task information corresponding to the target control instruction according to the target control instruction and the second corresponding relation information; and respond to the target control instruction based on the target task information.

According to one or more examples of the disclosure, the method further includes:

obtain a target ray element corresponding to the pose information; and display the target ray element based on the pose information.

According to one or more examples of the disclosure, the method further includes:

obtain a receiving timing corresponding to the target control instruction; and display a corresponding effect according to the receiving timing and the target ray element.

According to one or more examples of the disclosure, an apparatus for interaction is provided. The apparatus includes:

an obtaining module configured to obtain a target control instruction corresponding to a target object;

a first determination module configured to determine a target control region corresponding to the target control instruction in a virtual scene with the target control instruction, where the target control region displays at least one element;

a second determination module configured to determine a target element according to the target control instruction and the target control region, and the target element is comprised in the at least one element; and a response module configured to respond to the target control instruction according to the target element.

According to one or more examples of the disclosure, when the apparatus is configured to determine the target control region corresponding to the target control instruction in a virtual scene with the target control instruction, the apparatus is specifically configured to:

obtain pose information corresponding to the target object when the target control instruction is obtained;

determine a region corresponding to the pose information in the virtual scene with the pose information; and determine the target control region according to the region corresponding to the pose information.

According to one or more examples of the disclosure, the apparatus is further configured to:

obtain image information corresponding to the target object within a first preset duration;

determine action information of a user according to the image information; and trigger a step of obtaining a target control instruction corresponding to a target object when the action information is comprised in a preset gesture information set.

According to one or more examples of the disclosure, when the apparatus is configured to obtain the pose information corresponding to the target object, the apparatus is specifically configured to:

use the pose information received from the target object as the pose information corresponding to the target object, and alternatively, obtain image information corresponding to the target object; and determine the pose information corresponding to the target object according to the image information.

According to one or more examples of the disclosure, when the apparatus is configured to determine the region corresponding to the pose information in the virtual scene with the pose information, the apparatus is specifically configured to:

determine a target pose interval to which the pose information belongs according to the pose information and preset pose interval information, where the pose interval information comprises a plurality of pose intervals;

determine a target region corresponding to the target pose interval with the target pose interval and preset first corresponding relation information; and determine the region corresponding to the pose information according to the target region.

According to one or more examples of the disclosure, when the apparatus is configured to determine the target element according to the target control instruction and the target control region, the apparatus is specifically configured to:

obtain a set of control instructions corresponding to the target control region, where the set of control instructions comprises a plurality of first control instructions and elements corresponding to the first control instructions; and determine the target element corresponding to the target control instruction according to the target control instruction and the set of control instructions.

According to one or more examples of the disclosure, when the apparatus is configured to respond to the target control instruction according to the target element, the apparatus is specifically configured to:

obtain second corresponding relation information corresponding to the target element, and the second corresponding relation information includes a plurality of second control instructions for the target element, and task information corresponding to each of the plurality of second control instructions;

determine target task information corresponding to the target control instruction based on the target control instruction and the second corresponding relation information; and respond to the target control instruction according to the target task information.

According to one or more examples of the disclosure, the apparatus is further configured to:

obtain a target ray element corresponding to the pose information; and display the target ray element based on the pose information.

According to one or more examples of the disclosure, the apparatus is further configured to:

obtain a receiving timing corresponding to the target control instruction; and display a corresponding effect according to the receiving timing and the target ray element.

According to one or more examples of the disclosure, an electronic device is provided. The electronic device includes:

a processor; and a memory configured to store an executable instruction of the processor; where the processor is configured to execute the method by executing the executable instruction.

According to one or more examples of the disclosure, a computer-readable storage medium is provided. The computer-readable storage medium stores a computer program. The computer program implements step of the above method when executed by a processor.

Those of ordinary skill in the art may appreciate that the modules and algorithm steps of the instances described in conjunction with the examples disclosed herein may be implemented in electronic hardware, or a combination of computer software and electronic hardware. Whether these functions are performed with hardware or software depends on the specific application and design constraints of the technical solution. Those skilled can implement the described functions with different methods for each particular application, but such implementation should not be considered to fall beyond the scope of the disclosure.

In the several examples provided in the disclosure, it should be understood that the disclosed systems, apparatuses and methods can be implemented in other ways. For example, the apparatus examples described above are merely illustrative. For example, a division of the modules is merely a division of logical functions, and in practice there can be additional ways of division. For example, a plurality of modules or assemblies can be combined or integrated into another system, or some features can be omitted or not executed. Furthermore, coupling or direct coupling or communication connection between each other as shown or discussed can be achieved with some interfaces, and indirect coupling or communication connection between apparatuses or modules can be in an electrical form, a mechanical form or other forms.

The modules illustrated as separate components can be physically separated or not, and the components shown as modules can be physical modules or not, that is, can be located in one place, or can also be distributed over a plurality of network units. Some or all of the modules may be selected according to actual needs to achieve the purpose of the solutions of the examples. For example, the functional modules in the examples of the disclosure can be integrated into one processing module, or each module can be physically present separately, or two or more modules can be integrated into one module.

What are described above are merely being particular embodiments of the disclosure, and are not intended to limit the scope of protection of the disclosure, and any changes or substitutions that can readily occur to those skilled in the art within the scope of technology disclosed in the disclosure should fall within the scope of protection of the disclosure. Therefore, the scope of protection of the disclosure shall be subject to the scope of protection of the claims.

I claim:

1. A method for interaction, comprising:

obtaining a target control instruction corresponding to a target object;

determining a target control region corresponding to the target control instruction in a virtual scene with the target control instruction, wherein the target control instruction is directed to the target control region, and the target control region displays at least one element;

determining a target element according to the target control instruction and the target control region, wherein the target element is comprised in the at least one element; and responding to the target control instruction based on the target element;

wherein determining a target control region corresponding to the target control instruction in a virtual scene with the target control instruction comprises:

obtaining pose information corresponding to the target object in response to obtaining the target control instruction;

determining a region corresponding to the pose information in the virtual scene with the pose information; and determining the target control region according to the region corresponding to the pose information;

wherein determining a target element according to the target control instruction and the target control region comprises:

obtaining a set of control instructions corresponding to the target control region, wherein the set of control instructions comprises a plurality of first control instructions and elements corresponding to the first control instructions; and taking an element corresponding to a first control instruction identical to the target control instruction in the set of control instructions as the target element.

2. The method of claim 1, further comprising:

obtaining image information corresponding to the target object within a first preset duration;

determining action information of a user according to the image information; and triggering a step of obtaining a target control instruction corresponding to the target object in response to the action information being comprised in a preset gesture information set.

3. The method of claim 1, wherein obtaining pose information corresponding to the target object comprises:

determining pose information received from the target object as the pose information corresponding to the target object, or, obtaining image information corresponding to the target object and determining the pose information corresponding to the target object according to the image information.

4. The method of claim 1, wherein determining a region corresponding to the pose information in the virtual scene with the pose information comprises:

determining a target pose interval to which the pose information belongs according to the pose information and preset pose interval information, wherein the pose interval information comprises a plurality of pose intervals;

determining a target region corresponding to the target pose interval with the target pose interval and preset first corresponding relation information; and determining the region corresponding to the pose information based on the target region.

5. The method of claim 1, wherein responding to the target control instruction according to the target element comprises:

obtaining second corresponding relation information corresponding to the target element, wherein the second corresponding relation information includes a plurality of second control instructions for the target element, and task information corresponding to each of the plurality of second control instructions;

determining target task information corresponding to the target control instruction based on the target control instruction and the second corresponding relation information; and responding to the target control instruction according to the target task information.

6. The method of claim 1, further comprising:

obtaining a target ray element corresponding to the pose information; and displaying the target ray element based on the pose information.

7. The method of claim 6, further comprising:

obtaining a receiving timing corresponding to the target control instruction; and displaying a corresponding effect according to the receiving timing and the target ray element.

8. An electronic device, comprising:

a processor; and a memory configured to store an executable instruction of the processor;

wherein the processor is configured to execute instruction to:

obtain a target control instruction corresponding to a target object;

determine a target control region corresponding to the target control instruction in a virtual scene with the target control instruction, wherein the target control instruction is directed to the target control region, and the target control region displays at least one element;

determine a target element according to the target control instruction and the target control region, wherein the target element is comprised in the at least one element; and respond to the target control instruction based on the target element;

wherein the electronic device is further caused to determine a target control region corresponding to the target control instruction in a virtual scene with the target control instruction by:

obtaining pose information corresponding to the target object in response to obtaining the target control instruction;

determining a region corresponding to the pose information in the virtual scene with the pose information; and determining the target control region according to the region corresponding to the pose information;

wherein the electronic device is caused to determine a target element according to the target control instruction and the target control region by:

obtaining a set of control instructions corresponding to the target control region, wherein the set of control instructions comprises a plurality of first control instructions and elements corresponding to the first control instructions; and taking an element corresponding to a first control instruction identical to the target control instruction in the set of control instructions as the target element.

9. The electronic device of claim 8, the electronic device is further caused to:

obtain image information corresponding to the target object within a first preset duration;

determine action information of a user according to the image information; and trigger a step of obtaining a target control instruction corresponding to the target object in response to the action information being comprised in a preset gesture information set.

10. The electronic device of claim 8, wherein the electronic device is caused to obtain pose information corresponding to the target object by:

determining pose information received from the target object as the pose information corresponding to the target object, or, obtaining image information corresponding to the target object and determining the pose information corresponding to the target object according to the image information.

11. The electronic device of claim 8, wherein the electronic device is caused to determine a region corresponding to the pose information in the virtual scene with the pose information by:

determining a target pose interval to which the pose information belongs according to the pose information and preset pose interval information, wherein the pose interval information comprises a plurality of pose intervals;

determining a target region corresponding to the target pose interval with the target pose interval and preset first corresponding relation information; and determining the region corresponding to the pose information based on the target region.

12. The electronic device of claim 8, wherein the electronic device is caused to respond to the target control instruction according to the target element by:

obtaining second corresponding relation information corresponding to the target element, wherein the second corresponding relation information includes a plurality of second control instructions for the target element, and task information corresponding to each of the plurality of second control instructions;

determining target task information corresponding to the target control instruction based on the target control instruction and the second corresponding relation information; and responding to the target control instruction according to the target task information.

13. The electronic device of claim 8, the electronic device is further caused to:

obtain a target ray element corresponding to the pose information; and display the target ray element based on the pose information.

14. The electronic device of claim 13, the electronic device is further caused to:

obtain a receiving timing corresponding to the target control instruction; and display a corresponding effect according to the receiving timing and the target ray element.

15. A non-transitory computer-readable storage medium, storing a computer program, wherein a processor is configured to execute the computer program to:

obtain a target control instruction corresponding to a target object;

determine a target control region corresponding to the target control instruction in a virtual scene with the target control instruction, wherein the target control instruction is directed to the target control region, and the target control region displays at least one element;

determine a target element according to the target control instruction and the target control region, wherein the target element is comprised in the at least one element; and respond to the target control instruction based on the target element;

wherein the processor is configured to determine a target control region corresponding to the target control instruction in a virtual scene with the target control instruction by:

obtaining pose information corresponding to the target object in response to obtaining the target control instruction;

determining a region corresponding to the pose information in the virtual scene with the pose information; and determining the target control region according to the region corresponding to the pose information;

wherein the processor is configured to determine a target element according to the target control instruction and the target control region by:

obtaining a set of control instructions corresponding to the target control region, wherein the set of control instructions comprises a plurality of first control instructions and elements corresponding to the first control instructions; and taking an element corresponding to a first control instruction identical to the target control instruction in the set of control instructions as the target element.

* * * * *